United States Patent
Piekniewski et al.

(10) Patent No.: US 10,657,409 B2
(45) Date of Patent: May 19, 2020

(54) METHODS AND APPARATUS FOR TRACKING OBJECTS USING SALIENCY

(71) Applicant: Brain Corporation, San Diego, CA (US)

(72) Inventors: Filip Piekniewski, San Diego, CA (US); Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 16/291,470

(22) Filed: Mar. 4, 2019

(65) Prior Publication Data

US 2019/0251386 A1 Aug. 15, 2019

Related U.S. Application Data

(63) Continuation of application No. 14/860,579, filed on Sep. 21, 2015, now Pat. No. 10,268,919.

(Continued)

(51) Int. Cl.
*G06K 9/00* (2006.01)
*G06K 9/46* (2006.01)
(Continued)

(52) U.S. Cl.
CPC .......... *G06K 9/4671* (2013.01); *B25J 9/1664* (2013.01); *B25J 9/1697* (2013.01); *G01B 11/14* (2013.01);
(Continued)

(58) Field of Classification Search
CPC ....... B25J 9/1664; B25J 9/1697; G01B 11/14; G06K 9/00624; G06K 9/00664;
(Continued)

(56) References Cited

U.S. PATENT DOCUMENTS 6,359,601 B1 * 3/2002 Maguire, Jr. ........... G06F 3/013
345/7
7,809,197 B2 * 10/2010 Fedorovskaya .... G06K 9/00255
358/1.14

(Continued)

OTHER PUBLICATIONS

Lee, Jae-Yeong, and Wonpil Yu. "Visual tracking by partition-based histogram backprojection and maximum support criteria." 2011 IEEE International Conference on Robotics and Biomimetics. IEEE, 2011. (Year: 2011).*

*Primary Examiner* — Avinash Yentrapati
(74) *Attorney, Agent, or Firm* — Reed Smith LLP; Sidharth Kapoor

(57) ABSTRACT

Methods and apparatus for tracking and discerning objects using their saliency. In one embodiment of the present disclosure, the tracking of objects is based on a combination of object saliency and additional sources of signal about object identity. Under certain simplifying assumptions, the present disclosure allows for robust tracking of simple objects with limited processing resources. In one or more variants, efficient implementation of the methods described allow sensors (e.g., cameras) to be used on board a robot (or autonomous vehicle) on a mobile determining platform, such as to capture images to determine the presence and/or identity of salient objects. Such determination of salient objects allow for e.g., adjustments to vehicle or other moving object trajectory.

9 Claims, 10 Drawing Sheets

Related U.S. Application Data

(60) Provisional application No. 62/053,004, filed on Sep. 19, 2014.

(51) Int. Cl.

| | | |
|---|---|---|
| *G06K 9/48* | (2006.01) | |
| *G06T 7/246* | (2017.01) | |
| *G06T 7/90* | (2017.01) | |
| *G06T 7/285* | (2017.01) | |
| *H04N 9/797* | (2006.01) | |
| *G06K 9/32* | (2006.01) | |
| *G06T 7/20* | (2017.01) | |
| *G06T 7/292* | (2017.01) | |
| *B25J 9/16* | (2006.01) | |
| *G01B 11/14* | (2006.01) | |
| *G06T 3/00* | (2006.01) | |

(52) U.S. Cl.
CPC ..... *G06K 9/00624* (2013.01); *G06K 9/00664* (2013.01); *G06K 9/3241* (2013.01); *G06K 9/4623* (2013.01); *G06K 9/4642* (2013.01); *G06K 9/4652* (2013.01); *G06K 9/48* (2013.01); *G06T 3/00* (2013.01); *G06T 7/20* (2013.01); *G06T 7/246* (2017.01); *G06T 7/285* (2017.01); *G06T 7/292* (2017.01); *G06T 7/90* (2017.01); *H04N 9/7973* (2013.01); *G06T 2200/04* (2013.01); *G06T 2207/10024* (2013.01); *G06T 2207/20164* (2013.01); *G06T 2207/30241* (2013.01); *G06T 2215/16* (2013.01); *Y10S 901/09* (2013.01); *Y10S 901/47* (2013.01)

(58) Field of Classification Search
CPC .. G06K 9/3241; G06K 9/4623; G06K 9/4642; G06K 9/4652; G06K 9/4671; G06K 9/48; G06T 2200/04; G06T 2207/10024; G06T 2207/20164; G06T 2207/30241; G06T 2215/16; G06T 3/00; G06T 7/20; G06T 7/246; G06T 7/285; G06T 7/292; G06T 7/90; Y10S 901/09; Y10S 901/47

See application file for complete search history.

(56) References Cited

U.S. PATENT DOCUMENTS

| | | | | |
|---|---|---|---|---|
| 8,391,548 | B1* | 3/2013 | Medioni | G06K 9/00771 |
| | | | | 382/103 |
| 8,396,249 | B1* | 3/2013 | Khosla | G06K 9/3241 |
| | | | | 382/103 |
| 8,396,282 | B1* | 3/2013 | Huber | G06K 9/629 |
| | | | | 381/56 |
| 2005/0047647 | A1* | 3/2005 | Rutishauser | G06K 9/3233 |
| | | | | 382/159 |
| 2006/0008144 | A1* | 1/2006 | Prasad | G06K 9/00818 |
| | | | | 382/173 |
| 2007/0003130 | A1* | 1/2007 | Goerick | G06K 9/00664 |
| | | | | 382/153 |
| 2009/0018696 | A1* | 1/2009 | Goerick | B25J 9/161 |
| | | | | 700/245 |
| 2012/0093402 | A1* | 4/2012 | Staelin | G06K 9/4671 |
| | | | | 382/165 |
| 2012/0256941 | A1* | 10/2012 | Ballestad | G06K 9/00234 |
| | | | | 345/589 |
| 2014/0085507 | A1* | 3/2014 | Pillman | G06T 5/004 |
| | | | | 348/231.99 |
| 2014/0086486 | A1* | 3/2014 | Pillman | G06T 5/003 |
| | | | | 382/173 |
| 2014/0107842 | A1* | 4/2014 | Yoon | G05D 1/0248 |
| | | | | 700/259 |

\* cited by examiner

METHODS AND APPARATUS FOR TRACKING OBJECTS USING SALIENCY

CROSS-REFERENCE AND RELATED APPLICATIONS

This application is a continuation of U.S. patent application Ser. No. 14/860,579, filed Sep. 21, 2015 and claims the benefit of priority to U.S. Provisional Patent Application Ser. No. 62/053,004, filed Sep. 19, 2014, which are incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates to, inter alia, computerized apparatus and methods for detecting features in sensory information.

Description of Related Art

Saliency is a term often used in psychophysics and neuroscience where it may be defined as the ability to attract attention of a particular stimulus. In the visual modality, saliency may be attributed to objects or visual patterns. In primates there are five general aspects of the visual scene which spontaneously attract attention (a phenomenon often called pop-out):
  Color—a unique color surrounded by another color or colors (e.g., a red spot in sea of green) will involuntarily trigger attention.
  Orientation—a bar of one orientation surrounded by bars of another orientation
  Contrast (luminance)—an area characterized by large contrast (a bright thing mixed with very dark things)
  Motion—an object moving in a different direction or speed that surroundings.
  Faces—only for humans and some primates, image resembling a face The biological origin of this behavior is debated. One of the plausible mechanisms is local inhibitory interaction in visual cortex (and perhaps thalamus). Such inhibitory connections arise between neurons which represent things often co-occurring. For example, a segment of vertical line (observed by a spatially restricted receptive field of a neuron) is typically a fragment of a larger line. A color blob seen in a receptive field of a neuron is most often a fragment of a larger blob of the same color. Appearance of a feature (e.g., orientation) which is not expected in a given context (e.g., vertical line segment surrounded by a large number of horizontal lines) is statistically much more rare, therefore inhibitory connections for such occurrence are much weaker. In consequence the response of a neuron representing such "unexpected features" is stronger, as the otherwise present inhibition is lacking.

From an evolutionary point of view sensitivity to such unexpected stimuli is beneficial. It allows one to quickly detect anomalies in the visual scene, which often indicate behaviorally relevant information (e.g., a ripe, red fruit among green leaves; a dangerous predator hiding in the bushes).

SUMMARY

One aspect of the disclosure relates to a method of determining a distance to an object using at least a robotic device. The method in one embodiment includes: interleaving left and right images of the device surroundings to produce a video stream; evaluating the video stream to determine a distance to an object in a visual scene associated with the surroundings visual scene; and causing the robotic device to execute an action in based at least in part on the distance. The left and the right images may be provided by a left and right camera, respectively, the right camera disposed spatially from the left camera on the device. The interleaving and encoding may cooperate to effectuate the reduction in the energy use compared to executing the action without the interleaving.

Another aspect of the disclosure relates to a method of operating a robotic device. The method in one embodiment includes: obtaining an image of a visual scene during trajectory navigation by the device; transforming the image; determining a map based on an operation on pixels of the transformed image and pixels of the image; and determining a salient feature based on an evaluation of the map; and adjusting the trajectory in accordance with a parameter of the salient feature.

In some implementations, the map determination may comprise determination of color distance.

In some implementations, the method may comprise determining a shape characteristic of the feature. The parameter may comprise the characteristic.

In some implementations, the characteristic may be configured to characterize a circularity of the feature.

In some implementations, the method may comprise: obtaining a plurality of images image of the visual scene; determining motion flow information based on an operation on the image and one other image of the plurality of images; and tracking the feature through individual ones of the plurality of images based on the motion information.

Yet another aspect of the disclosure relates to a method of tracking an object in a sequence of images. The method may comprise: determining a saliency measure based on analysis of pixels of an image of the sequence of imaged; and providing the saliency measure to a tracking process, the tracking process configured to determine representation of the object in individual ones of the sequence of images.

In some implementations, the analysis of pixels may be configured based on pixel color. The determination of the saliency measure may comprise determining a color distance configured to maximize discriminability between the target and background.

In some implementations, the determination of the saliency measure may comprise determining orientation of the feature to initialize a color distance computation to maximize discriminability between the target and the background.

In some implementations, the method may comprise determining orientation saliency to initialize a tracker pick the salient object.

In some implementations, the method may comprise using distance saliency to initialize a tracker.

In some implementations, the method may comprise using color saliency to pick a number of object colors to maximize discriminability from the background.

Still another aspect of the disclosure relates to a controller of a robotic apparatus. The controller may comprise a sensor processing component configured to analyze sensor input. The sensor input analysis may be configured to: determine color saliency; initialize a tracking process using the color saliency; determine a salient feature; operate the tracking process to detect the feature; and communicate tracking information to a controller component configured to adjust trajectory of the robotic device in accordance with a characteristic of the feature.

In some implementations, the salient feature determination may be configured based on color saliency. The salient feature information may be automatically provided to the tracking process. The feature may comprise an object. The trajectory adjustment may be configured to reduce spatial separation between the object and the apparatus.

In some implementations, the controller may comprise a manipulator. The trajectory adjustment may comprise operating the manipulator to pick up the object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
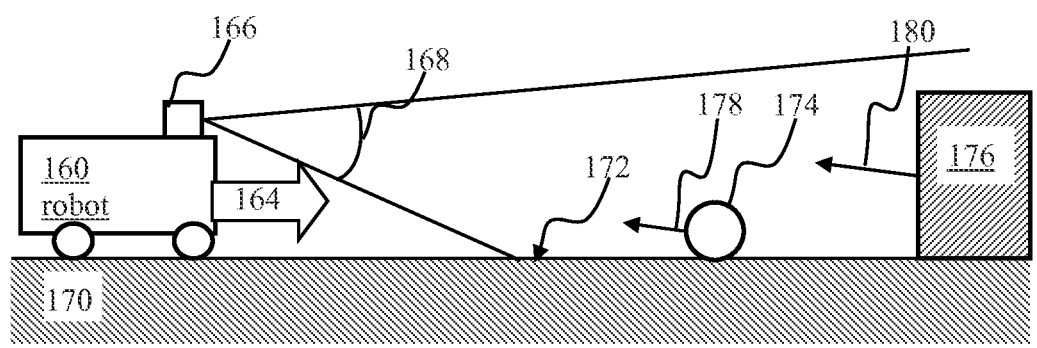
FIG. 1 is a graphical illustration depicting a robotic apparatus comprising an feature detection apparatus of the disclosure, configured for autonomous navigation, in accordance with one or more implementations.

All Figures disclosed herein are ©Copyright 2014-2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids, J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the terms "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" or "interface" refers to any signal, data, or software interface with a component, network or process including, without limitation, those of the FireWire (e.g., FW400, FW800, and/or other FireWire implementation.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, among other things, apparatus and methods for determining salient features in sensor data. In some implementations, the sensor data may comprise images of a visual scene obtained using a video camera. The video information may comprise for example multiple streams of frames received from a plurality of cameras disposed separate from one another. Individual cameras may comprise an image sensor (e.g., charge-coupled device (CCD), CMOS device, and/or an active-pixel sensor (APS), photodiode arrays, and/or other sensors). In one or more implementations, the stream of frames may comprise a pixel stream downloaded from a file. An example of such a file may include a stream of matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) may be applicable to and useful with various implementations of the present disclosure. Furthermore, data frames corresponding to other (non-visual) signal modalities such as sonograms, infrared (IR), radar or tomography images may be compatible with the processing methodology of the disclosure, or yet other configurations.

The salient feature detections processing methodology described herein may enable a controller of a robotic device to detect targets and/or obstacles that may be present during trajectory navigation by the device, e.g., 160 of FIG. 1.

FIG. 1 depicts a mobile robotic apparatus comprising a feature detection apparatus configured, e.g., in accordance with the exemplary implementations illustrated below. The robotic apparatus 160 may comprise a camera 166. The camera 166 may be characterized by a field of view 168

(e.g., an extent of the observable world that may be captured by the camera lens at a given moment). The camera 166 may provide information associated with objects within the field of view 168. In some implementations, the camera 166 may provide frames of pixels of luminance and/or color, refreshed at 25 Hz frame rate. However, it will be appreciated that, in some implementations, other frame rates may be used (whether constant or variable), as may other types of information provided by the camera(s) 166.

One or more objects (e.g., a floor 170, a stationary object 176, a moving object (e.g., ball 174), and/or other objects) may be present in the camera field of view. The motion of the objects may result in a displacement of pixels representing the objects within successive frames, such as is described in co-owned and co-pending U.S. patent application Ser. No. 13/689,717 filed on Nov. 29, 2012 and entitled "APPARATUS AND METHODS FOR OBJECT DETECTION VIA OPTICAL FLOW CANCELLATION", incorporated herein by reference in its entirety.

When the robotic apparatus 160 is in motion, such as shown by arrow 164 in FIG. 1B, motion of the objects within the camera 166 field of view 168 (e.g., denoted by arrows 172, 178, 180 in FIG. 1B) may comprise the self-motion component and the object motion component. By way of a non-limiting example, motion of objects in FIG. 1 may comprise apparent motion 180 of the stationary background 176 and the boundary (e.g., the component 172 associated with the floor boundary); (ii) component 178 associated with the moving ball 174 that comprises a superposition of the ball displacement and motion of the camera; and/or other components. As noted previously, determination of the ball 174 motion may be particularly challenging when the camera 160 is in motion (e.g., during panning) and/or when the field of view is changing (e.g., when zooming in/out).

Using relative aspects of an image may allow mitigation of certain problems related to lighting invariance. For example, the absolute color of the object and background) may vary widely depending on illumination, but relative saliency will often be preserved. These aspects of saliency may make it a useful perceptual input to an autonomous robotic platform.

In a computer system, an equivalent of saliency may be determined in a number of ways based on input images represented in one of the typical ways (e.g., RGB, YUV, HSV). Given some signal characterized by a spatial extent (e.g., an image or array of pixels representing a color or luminance), the system may determine a new array which for every spatial coordinate of the original input characterizes the likelihood of that input value. The lower the likelihood the greater the saliency of that particular area, in accordance with some implementations.

In this approach, the saliency may be determined using a back projection of the color histogram of the image. In some implementations, the saliency of individual pixels of the image may be characterized by the number of pixels representing the same exact value in the rest of the image. For example, there may be 300000 pixels having value 128 in the image and only 1000 pixels carrying value 0. In such case, the latter pixels may be less likely given the statistics of the image and therefore are a lot more salient. In some implementations, the saliency determination may be realized by one or more of the following steps:

Determine the histogram H of pixel values of the input image I.

Create a new image B (same size as the original) called back projection, in which every pixel carries the count of the pixels having the same value as the pixel in the original image at that location, that is:

$$B[x,y]=H[I[x,y]] \quad \text{(Eqn. 1)}$$

Create a new image S called saliency, which may be determined from B in a number of ways e.g.:

$$S[x,y]=1/(B[x,y]+\text{const}) \quad \text{(Eqn. 2)}$$

or $$S[x,y]=\text{const}-B[x,y]/f(B) \quad \text{(Eqn. 3)}$$

where f(B) may be a norm. Other expressions are possible depending on what is the desired range and precision of S.

Figure 2A:
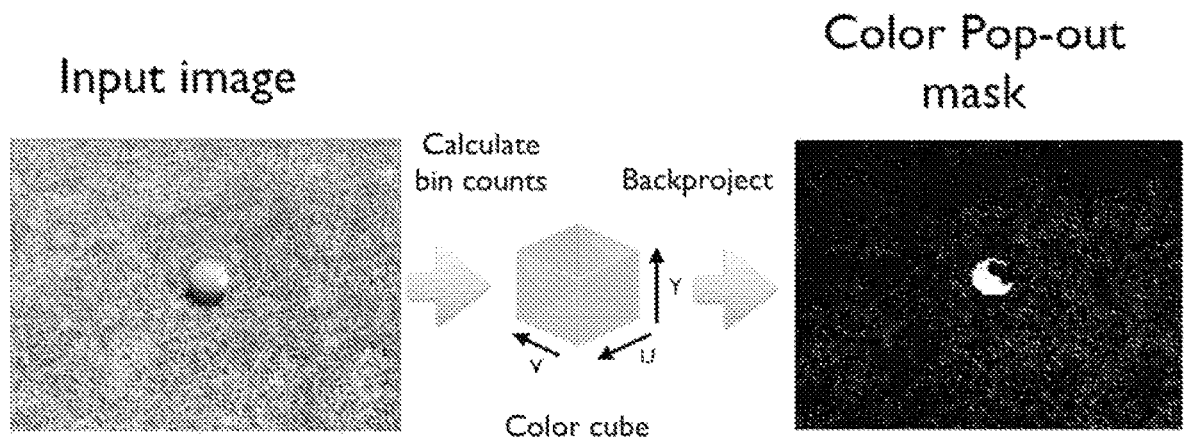
FIG. 2A is a plot illustrating use of saliency mask for feature detection using in a YUV color space image, according to one or more implementations.

In some cases, determining the full histogram may be impractical, e.g., when pixels can take values in a very large space. For example, in 24 bit RGB (Red, Green, Blue) there are 16.7 million possible pixel values. For most images every value of the image is carried by one or at most a few pixels. Determining the histogram for saliency in such case would provide a very weak signal, as the majority of pixels would be very salient (unique). To improve the dynamic range of such maps, binning may be used. That is, individual bins of the histogram do not correspond to a single value, but rather a range of values. Color spaces are often three dimensional. In these cases (e.g., as illustrated in FIG. 2A), the bins may correspond to cubes tiling the color space. In some implementations, the color space may be tiled uniformly in each direction (e.g., RGB color cube may be subdivided into 27 subcubes each spanning ⅓ of each dimension). In other color spaces where luminance is represented separately from chrominance (color information), e.g., YUV, HSV, etc., the binning may not be uniform (e.g., bins may be larger along the luminance dimension and smaller along chrominance directions). In addition to or as an alternative to binning, clipping the range for bins and/or dynamically placed bin edges may be used. This may allow control of the dynamic range of the saliency map along different aspects of the image. In some implementations, there may be just one bin along luminance direction and many along the chrominance directions. In such case, the saliency may ignore variability of the luminance and the resulting map may be invariant to luminance changes.

In this approach saliency may be determined based on the difference between a pixel and the average value of pixels in a surrounding region. In some implementations, the image I may be convolved with a low-pass kernel (e.g., a Gaussian kernel) to create a low-passed image B. Next the saliency heat map may be generated attributing to individual pixels the distance between a pixel in the original image I and the low-passed image B. This may be summarized in the points below:

Determine a low-passed image B from original image I.
Create a saliency heat map H, where $$H[x,y]=f(B[x,y],I[x,y]), \quad \text{(Eqn. 4)}$$

f being the distance function.

In some implementations, the larger the distance (e.g., the further the pixel from the averaged value of its surround), the more salient it is. Distance function f may be a Euclidean distance (e.g., determined on the values of pixels), some form of Manhattan distance (e.g., sum of absolute values of differences between coordinates). Similarly to color pop-out the distance may amplify or ignore certain aspects of the image (e.g., ignore distances in luminance and only process chrominance).

The same methodology as for the above pop-out determination for color may be extended to other features and/or representations of image. For example, the dominant orientation may be determined across an image. The orientation may be characterized by a set of parameters including one or more of angle, phase, frequency, contrast, and/or other parameters. A new image may be generated from the original input image whose pixel values will represent the properties of orientation as above. A saliency determination may be carried out on such processed image in the same way as on color images. In this case, however, the saliency may detect anomalies in orientation aspects of the image.

The same methodology as described above may be applied to a sequence of images and in particular to aspects which characterize the differences between consecutive images in a sequence. One such aspect is optic flow (e.g., a vector field representing the velocity and direction of motion between frames of an image sequence). There may be multiple ways to estimate motion which will return an estimate on the vector field. This vector field may be seen as a new image which channels are encoding different aspects of motion. This new array of data may be processed in ways similar to those described above, namely global/local statistical analysis along individual or combinations of channels. These analyses may reveal anomalies and/or indicate motion saliency. In some implementations, camera input may represent a view from a moving camera. The majority of the motion may be along a particular direction (e.g., corresponding to the direction of motion of the camera), and therefore may not be salient. Some object, however, may be moving independently and its motion may be perceived as salient. In some implementations, a system may control its movements and observe the environment through a camera. Certain motor commands (e.g., forward, left) may be associated with particular motion flow fields (e.g., left command will generate a relatively uniform motion flow towards right). Given the features of the motion field given the current command, any deviation from that expectation may be marked as salient. For example, if the agent is moving forward it is expecting a motion field origination from the direction of motion and radially expanding towards the sides (looming). If suddenly a portion of the motion flow is convergent, it may indicate an object moving away from an agent. Such an object may be marked salient in some implementations (e.g., when the agent is supposed to follow a moving target).

In systems equipped with sensors that allow for acquisition of a depth map (e.g., time of flight sensor, or stereo camera rig determining disparity, lidar) saliency detection may be performed on the depth information. In such case the salient object may be the object at a distance different than much of the rest of the scene. This map may be particularly useful for autonomous flying drones for detection of obstacles.

Saliency may be used to identify the presence of objects in visual scene. However, that information alone (except for the most trivial of cases with only one very salient object in the scene) may not be sufficient to track objects in complex environments. Additional signals identifying the object of interest may be necessary, according to some implementations. Combining the saliency with object identity masks may allow for robust tracking, even in relatively complex environments.

Objects may be often characterized by color. Color alone, however, may not be a perfect feature to support tracking, as absolute value of color may often vary widely due to illumination changes (e.g., when the object enters a shadow). Even the weak color information may be sufficient to distinguish between the object of interest and other salient objects (if present). To illustrate, a red ball on an orange carpet may become brown when in shadow. In fact, the orange carpet may become red in the shadow. Relying only on absolute color value in this case may lead to substantial errors. But the red ball may likely remain the most salient object whether in shadow or not. Among the salient objects detected on the floor, it may likely still be the reddest. This method may lead to much better tracking performance.

Figure 2B:
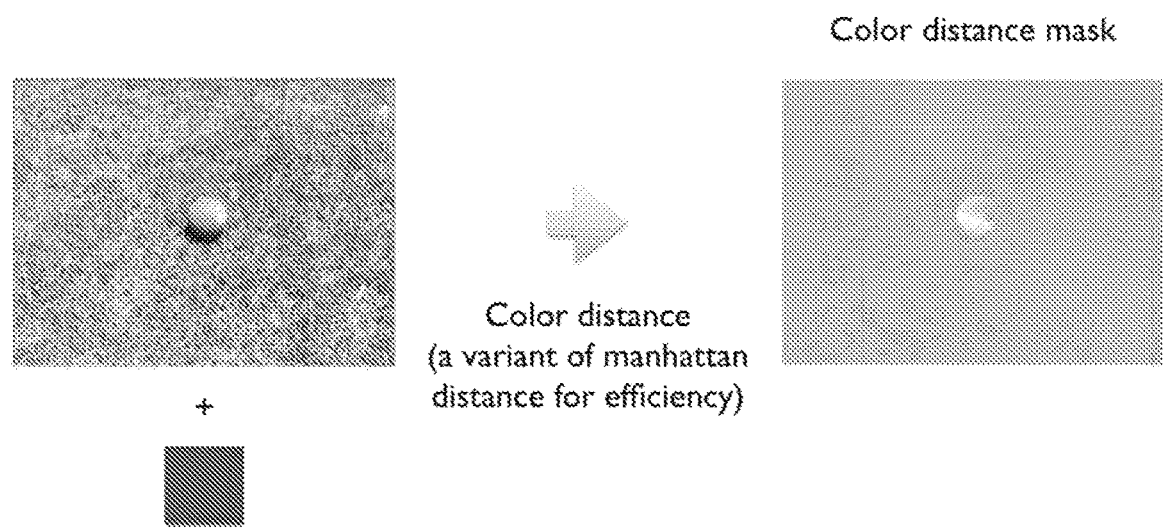
FIG. 2B is a plot illustrating use of color distance for determining a salient feature in an image frame shown in FIG. 2A, according to one or more implementations.

Color distance may be determined in a number of ways, depending on the representation. In some implementations, Euclidean distance in the color space may be used, but this solution may be computationally expensive and may not lead to the best results in certain color spaces. In one such implementation (e.g., such as that shown in FIG. 2B), a version of Manhattan distance may be used in the general form of:

$$f(A,B)=\Sigma\_(i=1)^n \alpha\_i |A\_i - B\_i| \quad \text{(Eqn. 5)}$$

where parameters $\alpha\_i$ are weighting factors which amplify or ignore certain aspects (channels) of image representation. For example, the distance in the luminance direction may be taken with less weight than distance in the chrominance directions.

A typical object may comprise one or more color surfaces (i.e., areas of similar color and reflectance). Color surfaces may be salient when they are sufficiently distinct from the background or surrounding surfaces. Finding a pixel or a small group of pixels with the highest value of color saliency may be used as a first step in determination of the salient color surface. Determining the spatial extent—e.g., the mask—of the most salient color surface in an image or in a time-series of images may be important for two (or more) reasons. First, the mask may provide the statistics of colors (or reflectances) in the most salient color surface. These statistics may allow better evaluation of the color distance between the most salient color surface and the other ones, and/or to better track the salient object as it moves in the environment. For example, the mask of the most salient color surface may be used for choosing the color prototype used in the color distance. Second, the mask of the most salient color surface may provide an estimate of the apparent size of the salient object, and/or may provide a relative distance cue: when the area of the color surface increases, it is likely that the object becomes closer to the viewer, or becomes less occluded by other objects.

To determine the mask—the region of the visual field—occupied by the most salient color surface, the following algorithm may be used, according to some implementations. First, the location of the peak in saliency map (heat map) may be determined. The heat map used may be a purely color-based saliency, or a heat map determined by multiplicatively combining multiple heat maps as described below. It may be beneficial to blur the heat map. Next, either a fixed threshold may be applied or a dynamic approach may be used to provide a Boolean mask or where the target is located.

In some implementations, using a dynamic approach, a threshold in the saliency heat map may be gradually decreased below the peak value, to produce an increasingly large contour around the heat map peak. The threshold lowering may be terminated when the chroma range within the contour exceeds some predetermined numerical value minmax_UV. In YUV color coordinates, the chroma range may, for example, be defined as max(max(U)-min(U), max (V)-min(V)). In YUV coordinates, where U and V are between 0 and 255, minmax_UV may have values between 20 and 40. Larger minmax_UV values may allow for more color variance within a color surface; that is, the algorithm may be more likely to treat adjacent areas of similar chroma as one color surface rather than as distinct color surfaces.

In many cases the objects that are tracked may be characterized by shape information. In general, shape-based characterizations may not be easy and may be computationally intense. There may be some cases, however, where such characterizations may be implemented efficiently.

Circular shapes may be among the easiest to characterize due to symmetries and rotational invariances of a circle. There may be multiple ways of detecting circles, most notably using Hough moments, but this method can sometimes be very slow. A simpler and more efficient process may be carried out by performing one or more of the following steps:

Given a heat map indicating possible locations of objects (e.g., generated as the color pop-out heat map, or via threshold on the color distance or combination thereof), threshold the heat map to obtain outlines of object candidates.

On the thresholded heat map, determine the contours of the object candidates.

For each contour, determine the smallest enclosing circle.

Determine the ratio between the area of the contour and the area of the smallest enclosing circle (this ratio may be referred to as the circularity ratio).

Processing of the circularity ratio through function f may be used to obtain circularity parameter as a result. This step may be used to control the dynamic range of the circle detection. The function f can for example be $f(x)=x^2$, in which case due to the convexity of this function less circular shapes will obtain even smaller circularity parameter.

If the contour is circular, the ratio between its area and the area of minimal enclosing circle may be very close to one. Alternatively, if a contour is, e.g., a line, then the ratio of areas may be close to zero. Because the ratio is determined for all the candidate object areas, an additional object circularity heat map may be generated by performing one or more of the following steps:

Create an empty circularity heat map H.

Sort contours in an increasing order with respect to circularity parameter.

For every contour in the original heat map, draw the smallest enclosing circle of that contour on heat map H. Alternatively draw the contour itself on the heat map H.

The intensity of the fill of the drawn circle (contour) should be proportional to the circularity parameter.

The identity of the tracked object may be estimated by tracking the motion of elements (features) of the object from its current position to a new position. This signal may be noisy, particularly in complex environments filled with different motions. Tracking based solely on such motion information may diverge from the object in short order. However, the estimates from one frame to the next may be relatively accurate and may be used as an additional prior to identify the object of interest (particularly given a strong saliency map that filters out much of the background).

In systems equipped with depth sensors (e.g., time of flight sensor, or stereo camera rig determining disparity, lidar) distance information may provide useful information in maintaining the object of interest. Given a saliency signal which already separates the visual scene into a few candidate locations, the areas at a distance widely varying from the distance to previously tracked location of the object may be discarded, simplifying the tracking task and limiting the number of false positives.

The physical reality may be characterized by continuous changes. Therefore, the tracked object may be unlikely to suddenly disappear from its current location and reappear somewhere else. This fact may be exploited by adding an additional identity signal close to the previous known location of the object. In some implementations, involving a kinematic mask, a simple motion estimate of the object may be determined based on two or more last known previous locations to give an estimate of the next location. A heat map of expected object location may be provided, which may be integrated with other sources of information described herein.

In some implementations, the final heat map determined in a previous time step may be integrated (e.g., as described below) into the determination of the new heat map. In the simplest case, a convex combination of the new evidence with the previous heat map may be used to determine the new heat map. This results in a component of the heat map being a temporarily low-passed version of the signal.

In some implementations, histogram back projection may be used to provide evidence for the tracker. A histogram of color channel (or multiple channels, or channels encoding other features than color) may be determined in the area where the object is present. In subsequent steps, a heat map (such as the one illustrated in FIG. 2A) may be generated by back-projecting the counts of the bins back into the pixel space (that is every pixel in the heat map is proportional to bin count to which the original pixel in the image belongs). In some implementations, the histogram back projection may be determined only on chromatic channels (containing color information) to make the method tolerant to luminance changes. In some implementations, back projection may be performed independently for individual chromaticity (or other feature) channels. In some implementations, the resulting heat map may be obtained by additive, multiplicative, or hybrid integration (e.g., as described below).

In some implementations, specific constraints may exist that may be incorporated into the tracker that can substantially improve tracking performance. For example, in certain applications the object of interest may very rarely appear in a particular location of the visual field, but that same location can often have distractors. In such case, a constant prior map may be engineered and incorporated into the tracking system, to lower the likelihood of object detection at a particular location and enhance in other areas.

In some implementations, certain patterns may exist in the spatial areas where the object appears but these may not be known in advance. For example, an implementation meant to track cars of a particular color may be deployed in a new location. The road may occupy only a part of the visual field. The system while tracking target objects may integrate information about where the objects were detected to enhance generate additional prior heat map. Such a heat map, much like the constant prior map, may limit the number of false positives in the area where the object is statistically unlikely to appear.

Typically computer vision trackers may be initialized using mouse and keyboard by giving them the initial bounding box on the tracked object. This method may not be very well suited for autonomous robots or vehicles that need to track because these are not often equipped with a screen and input device. Alternatively, certain color tracking cameras (e.g., PixyCam) use a special button indicating initialization and pick the color of the object present in the center of the visual field of the camera. To indicate the color of the object picked the camera has an LED that outputs the primed color. According to one or more implementations, the tracker may use the saliency mask to find the object of interest and/or may use this mask to prime/initialize one or more trackers. In some implementations, the uninitialized tracker determines the saliency map (e.g., color saliency map). The uninitialized tracker may find candidate objects (salient areas) and select the largest (alternatively the one containing most saturated color, or some weighted combination of those features) area. Once the area is selected, other mechanisms of the tracker responsible for maintaining the identity of the tracked object may be initialized. A color prototype against which the color distance mask may be determined is selected. In some implementations, individual colors contained within the target mask may be tested for its discriminability of determining target versus background using color distance and a fixed threshold. The color from the target which maximizes discriminability may be chosen as the color prototype. Further, once the color prototype has been chosen, the optimal threshold may be determined by trying some or all thresholds, and using the one that maximizes discriminability. In some implementations, a combination of colors and/or other features may be selected. In some implementations, a motion saliency map may be used to estimate the priming object. In such case, priming of the tracker may be equivalent to shaking the object of interest on front of the camera. In some implementations, a distance saliency map may be used to prime the tracker, in which case the object a substantially different distance (e.g., closer) than others may be selected. Many other use cases are possible, in which weighted combinations of the above mentioned saliency masks are combined to select the most salient object for tracking.

Figure 3:
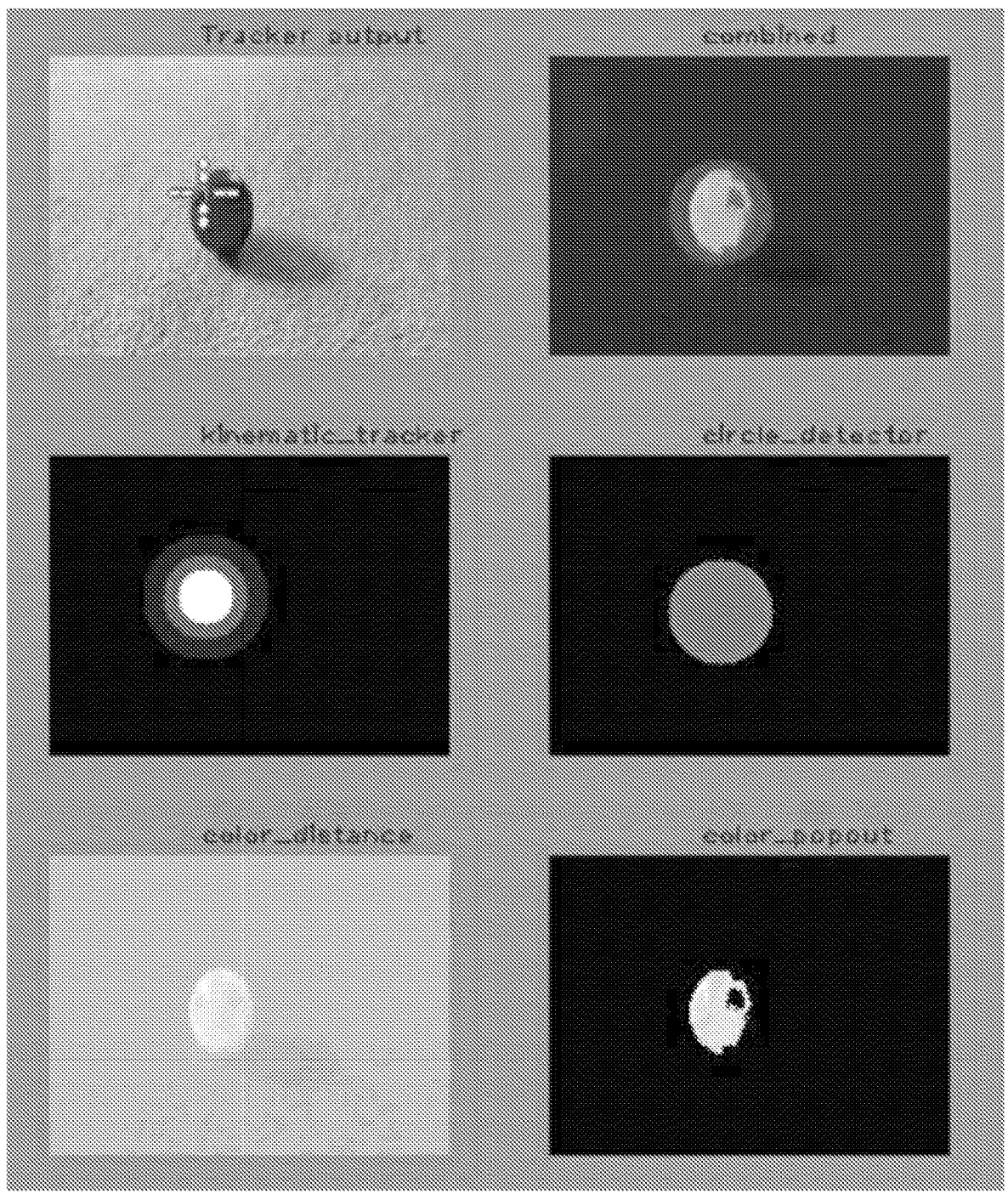
FIG. 3 is a plot presenting exemplary heat maps obtained using methodology described herein, according to one or more implementations.

FIG. 3 presents an exemplary use of a saliency mask (here, a global color saliency mask) to prime other signals identifying the target. In the example, the ball stands out sharply from the background. Filtering and thresholding is applied to obtain a contour of the outstanding object. Next an optimization technique is applied to determine the color, i.e., which object is the best distinguished object from background.

The signals (e.g., heat maps) described above may be integrated in a number of ways to provide a combined map representing the likelihood of presence of the object of interest. In some implementations, the different heat maps may be characterized by a scalar signifying the confidence of the signal. Given confidence c $i \in [0,1]$, heat maps may be integrated multiplicatively as follows:

$$C = \Pi_{(i=1)}^{n}((1-c_i)+H_i c_i) \quad \text{(Eqn. 6)}$$

assuming that $H_i(x,y) \in [0,1]$. In this case, a heat map with confidence c=0 may contribute a constant equal to 1 in the product, therefore may not change the result. On the contrary, a heat map with confidence c=1 may enter the product possibly significantly changing the result. Note that certain heat maps may be obtained as function of others. For example, the circle detection heat map described above may be obtained from the color saliency map.

Figure 4:
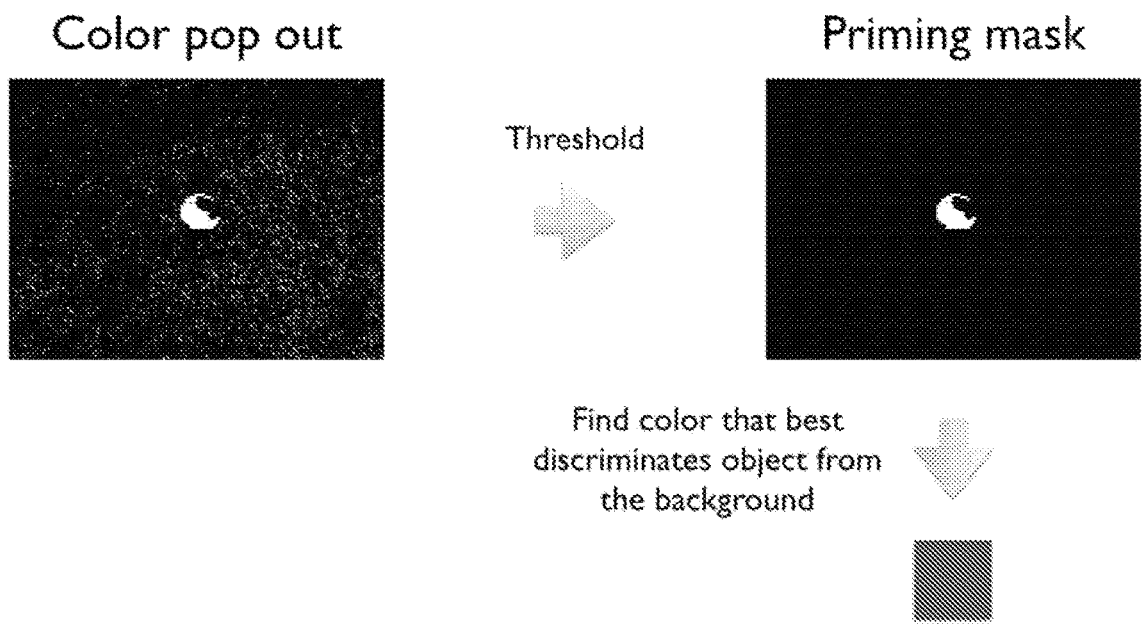
FIG. 4 is a plot illustrating use of a heat map as a priming map for detecting salient feature, according to one or more implementations.

FIG. 4 illustrates use of integration of 3 different heat maps in a multiplicative way, in accordance with one or more implementations.

In some implementations, the final heat map may be generated as a weighted sum of the individual heat maps as follows:

$$C = \Sigma_{(i=1)}^{n} \alpha_i H_i \quad \text{(Eqn. 7)}$$

Figure 5:
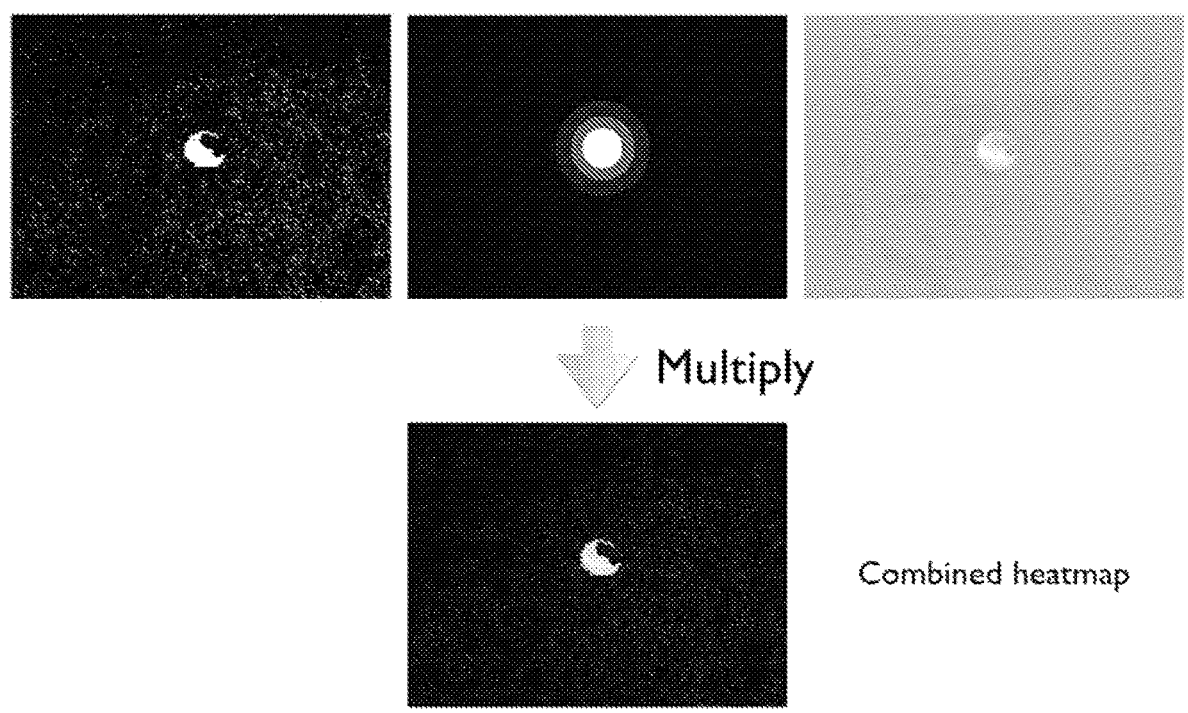
FIG. 5 is a plot illustrating use of multiple heat maps for salient feature detection, according to one or more implementations.

In certain applications, a combination of additive and multiplicative integration techniques may be used, as illustrated in FIG. 5. For example, certain heat maps may have the ability to exclude certain positions from being considered as containing the object. For example, if it is known that the object of interest will always be within a given distance from the device, a depth heat map may have a set detection threshold at that distance (e.g., everything further than the given distance is encoded as zero) may be integrated multiplicatively (e.g., if the heat map is zero in some location then, that area may be safely excluded from consideration regardless of other evidence/information). In some cases, the evidence may not have excluding properties of the object of interest characterized by a color and shape, than if one of those features is absent (e.g., due to particular illumination), the area may still be considered as possible location of the object. In such case, those heat maps may be combined additively. Overall integration scheme can therefore be a hybrid of additive and multiplicative schemes, according to some implementations.

Given the final combined heat map the tracker may be configured to determine the target object location and/or bounding box. Various techniques and heuristics may be used at that stage to further estimate if the tracker is still following the object of interest.

The bounding box may be determined in a number of ways. In some implementations, a flood fill on the color distance originating at the peak of the combined heat map with a tolerance may be performed to estimate a connected component containing the combined heat maps peak. Next the bounding box may be determined as the smallest enclosing rectangle of the connected component. In some implementations, the flood fill may be determined on the color pop out heat map. In some implementations, the flood fill may be determined on the summed, threshold heat maps for more than one modality (for example color distance and color pop out). In some implementations, the connected component may be determined directly on the combined (multiplicative) heat map. This may be advantageous in cases where the object is not characterized by a very distinctive color and therefore the color distance alone is providing a weak signal. At the same time this method may be disadvantageous in cases when properties of previously determined bounding box are used to determine the new heat map (e.g., one of the heat maps used to estimate new object location is a heat map composed of the previous bounding box) as in such case accumulation of error may occur.

In some cases the tracked object may contain multiple colors. Presence of multiple colors in close vicinity may simplify tracking. In some implementations, the initial area of interest as provided by the saliency heat map (pop-out mask) may be analyzed and a number of distant (in color space), saturated color prototypes may be acquired. For individual prototypes, a color distance mask may be determined in subsequent frames. For a given new frame, a set of candidate object locations may be established based on saliency mask. For individual candidate regions, a set of minimal distances to saved color prototypes may be determined. A logical analysis may performed to find the area giving best match. In one instance the condition may be that an area is rejected if one of the color distances exceeds a pre-established threshold. In some cases, this threshold may be different for different color prototypes, e.g., being a function of color discriminability from the first (priming frame). In some implementations, a weighted sum of minimal color distances may be determined and compared to a threshold. In such case even if one of the colors from the prototype set is missing from the area of interest (large distance), the presence of other colors from the prototype set may drag the sum down and eventually be accepted as possible location of the target.

In some cases there may be multiple objects in the scene that pass the tracking criteria. In some implementations, the tracker may return positions and bounding boxes of all of those locations. In some implementations, the tracker may return the position of the largest region of interest. In some implementations, the tracker will return the region closest to the previously returned location.

The output of the tracker may be used to drive robotic behavior, particularly as an input to a system predicting the next motor action of a robot (referred to as predictor in the following section). Various ways of representing the tracker output may be used for that application.

In this case, the tracker logic may make the decision if the object of interest is still present in the visual field. If it is, the tracker may output the bounding box of the object in visual space coordinates. If the object is absent, a special signal may be sent to indicate that (e.g., a bounding box with negative coordinates or a null object). Before entering the predictor (which for example maybe implemented a neural network having a plurality of input units) the tracker output may be converted to a form more suitable for subsequent processing. In some implementations, the actual bounding box may be converted to a heat map that is zero outside of the box and one inside. That pseudo heat map may be passed through a preprocessing layer of neurons having spatial receptive fields covering the visual space. Individual neurons may get activated proportionally to the fraction of the receptive field occupied by the box (value one). Therefore, a neuron which has only zeros in its receptive field may not be activated (activation zero), while the one whose entire receptive field is occupied by the box (value one) may be fully activated. The vector of such activations may become the actual input of the predictor. In some implementations, the center coordinates of the bounding box, together with its width and height may be feed as inputs.

In some implementations, the decision of whether the tracker still follows the object of interest may be avoided altogether and passed onto the behavior prediction system. In this case the integrated system (robot together with behavior predicting system) may learn the behaviors relevant for the "tracked" object. In some instances a final heat map of object presence may be passed directly to the predictive system. In some implementations, the heat map may be passed through a preprocessing layer (e.g., as described in the paragraph above). In some implementations, the location of the peak of the heat map, together with the value at the peak and an estimate of the size of the peak at half of the maximal value, may be passed to the predictive system.

By avoiding the classification (decision if the object is tracked or not) the predictive system may take into account additional information not available to the tracker on whether the final heat map contains behaviorally relevant information. For example, the predictive system may learn to adjust the threshold for the detection based on one or more of the position/orientation of the robot, time of day, and/or other aspects inaccessible to the tracker.

Parts of the above described methodology are applicable to other modalities. For example, much of the visual tracking methods are applicable in thermography, sonar data, radar data, and/or other applications. Saliency detection may be carried out in sonography, for example, by determining relevant histograms on the spectral representation of the time slice of sound.

Figure 6:
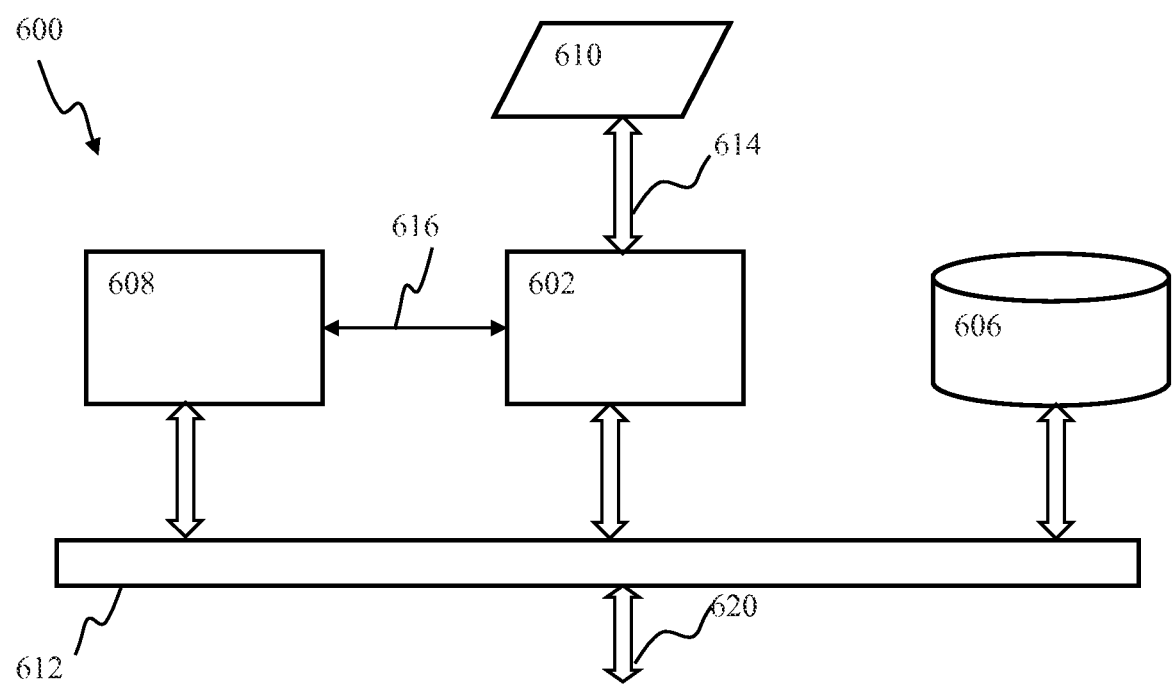
FIG. 6 is a functional block diagram depicting a computerized data processing system configured for salient feature detection, according to one or more implementations.

Various computerized devices may be employed for implementing methodology described herein. One particular implementation of the computerized neuromorphic processing system, for use with an adaptive robotic controller is illustrated in FIG. 6. The computerized system 600 of FIG. 6 may comprise an input device 610, such as, for example, an image sensor and/or digital image interface. The input interface 610 may be coupled to the processing block (e.g., a single or multi-processor block) via the input communication interface 614. In some implementations, the interface 614 may comprise a wireless interface (cellular wireless, Wi-Fi, Bluetooth, etc.) that enables data transfer, e.g., to the processor 602 from remote input/output (I/O) interface 610. One such implementation may comprise a central processing apparatus coupled to one or more remote camera devices providing sensory input to the adaptive predictor block (e.g., as described in co-owned and co-pending U.S. patent application Ser. No. 13/842,562 entitled "ADAPTIVE PREDICTOR APPARATUS AND METHODS FOR ROBOTIC CONTROL", filed Mar. 15, 2013, the foregoing being incorporated herein by reference in its entirety.

The system 600 further may comprise a random access memory (RAM) 608, configured to store neuronal states and connection parameters and to facilitate synaptic updates. In some implementations, synaptic updates may be performed according to the description provided in, for example, in co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 608 may be coupled to the processor 602 via a direct connection 616 (e.g., memory bus). The memory 608 may also be coupled to the processor 602 via a high-speed processor bus 612.

The system 600 may comprise a nonvolatile storage device 606. The nonvolatile storage device 606 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 606 may be used to store state information of the neurons and connections for later use and loading previously stored network configuration. The nonvolatile storage 606 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 600 may be coupled to one or more of an external processing device, a storage device, an input device, and/or other devices via an I/O interface 620. The I/O interface 620 may include one or more of a computer I/O bus (PCI-E), wired (e.g., Ethernet) or wireless (e.g., Wi-Fi) network connection, and/or other I/O interfaces.

In some implementations, the I/O interface may comprise a speech input (e.g., a microphone) and a speech recognition module configured to receive and recognize user commands.

It will be appreciated by those skilled in the arts that various processing devices may be used with computerized system 600, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 7:
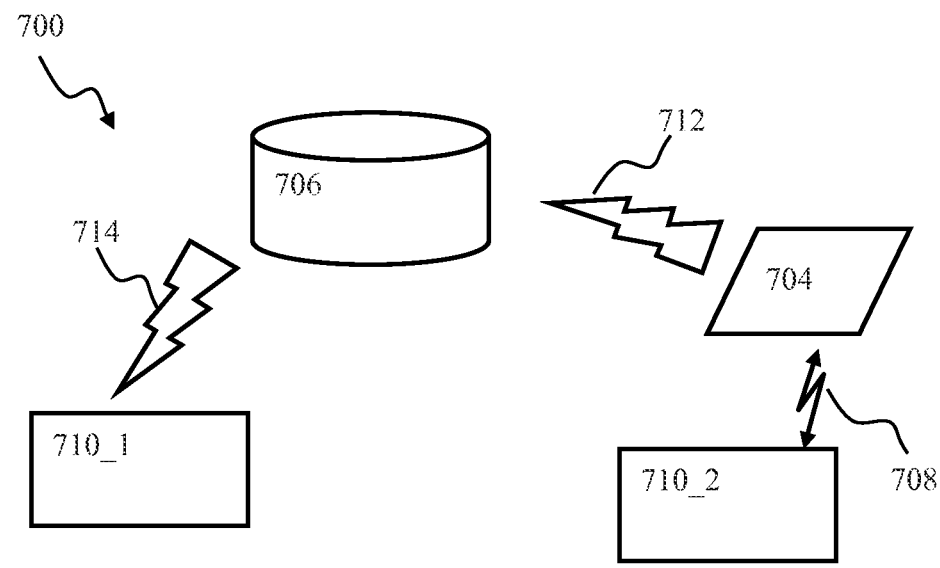
FIG. 7 is a functional block diagram depicting a system comprising salient feature detection apparatus, according to one or more implementations.

FIG. 7 illustrates a computerized system comprising a learning controller apparatus of the present disclosure, in accordance with one implementation. The system 700 may comprise a computerized entity 706 configured to communicate with one or more learning controllers 710 (e.g., 710_1, 710_2). In some implementations, the entity 706 may comprise a computing cloud entity (e.g., a cloud service or a server in a public, private or hybrid network). In one or more implementations, the entity may comprise a computer server, a desktop, and/or another computing platform that may be accessible to a user of the controller 710. In some implementations of the cloud computing services, one or more learning controller apparatus 710 may communicate with the entity 706 in order to access computing resources (e.g., processing cycles and/or memory) in order to, e.g., detect features and/or objects in sensory data provided by, e.g., sensor module 172 of control system in FIG. 1. In some implementations, the learning controller apparatus 710 may communicate with the entity 706 in order to save, load, and/or update, their processing configuration (e.g., learning configuration 812 in FIG. 8). The robotic brain images may comprise executable code (e.g., binary image files), bytecode, an array of weights for an artificial neuron network (ANN), and/or other computer formats. In some implementations, the learning controller apparatus 710 may communicate with the entity 706 in order to save and/or retrieve learned associations between sensory context and actions of a robot, e.g., as described in co-owned and co-pending U.S. patent application Ser. No. 14/244,888, entitled "LEARNING APPARATUS AND METHODS FOR CONTROL OF ROBOTIC DEVICES VIA SPOOFING", filed Apr. 3, 2014 and incorporated herein by reference in its entirety.

In FIG. 7, one or more learning controller apparatus (e.g., 710_1) may connect to the entity 706 via a remote link 714, e.g., WiFi, and/or cellular data network. In some implementations, one or more learning controller apparatus (e.g., 710_2) may connect to the entity 706 via a local computerized interface device 704 using a local link 708. In one or more implementations, the local link 708 may comprise a network (Ethernet), wireless link (e.g. Wi-Fi, Bluetooth, infrared, radio), serial bus link (USB, Firewire, etc.) and/or other. The local computerized interface device 704 may communicate with the cloud server entity 706 via link 712. In one or more implementations, links 712 and/or 714 may comprise an Internet connection, and/or other network connection effectuated via any of the applicable wired and/or wireless technologies (e.g., Ethernet, Wi-Fi, LTE, CDMA, GSM, and/or other).

In one or more applications that may require computational power in excess of that that may be provided by a processing module of the learning controller 710_2 the local computerized interface device 704 may be used to perform computations associated with training and/or operation of the robotic body coupled to the learning controller 710_2. The local computerized interface device 704 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

Figure 8:
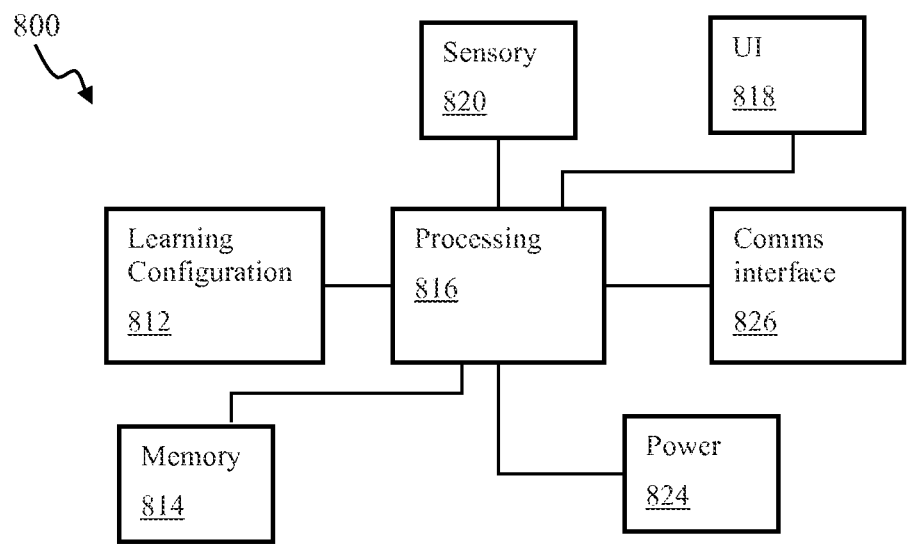
FIG. 8 is a functional block diagram depicting the salient feature detection apparatus of, e.g., FIG. 7, according to one or more implementations.

FIG. 8 is a functional block diagram detailing components of a learning apparatus (e.g., apparatus 160 of FIG. 1) in accordance with one implementation. The learning apparatus 800 may comprise a memory component 812 configured to store a learning configuration. In one or more implementations, the learning configuration may comprise an array of efficacies of an artificial neuron network and/or contents of a lookup table. Additional memory 814 and processing capacity 816 is available for other hardware/firmware/software needs of the apparatus. The processing component 816 may interface to the sensory component 820 in order to obtain and process sensory data for, e.g., object detection, face tracking, stereo vision, and/or other tasks.

The processing component may interface with electro-mechanical, user interface (UI) 818, sensory 820, electrical, power 824, and communications interface 826 components via driver interfaces and/or software abstraction layers. Additional processing and memory capacity may be used to support these processes. It will be appreciated that these components may be fully controlled by the robotic brain. The memory and processing capacity may aid in management of learning configuration (e.g., loading, replacement), operations during a startup, and/or other operations. Consistent with the present disclosure, the various components of the device may be remotely disposed from one another, and/or aggregated. For example, the learning configuration may be executed on a server apparatus, and control the mechanical components via network or radio connection while memory or storage capacity may be integrated into the brain. Multiple mechanical, sensory, or electrical units may be controlled be a learning apparatus via network/radio connectivity.

The electro-mechanical components may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, and/or other electro-mechanical components. The electro-mechanical components may further include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The user interface components 818 may comprise virtually any type of device capable of registering inputs from and/or communicating outputs to a user. These may include, without limitation, display, touch, proximity sensitive interface, light, sound receiving/emitting devices, wired/wireless input devices and/or other devices.

The sensory devices 820 may enable the learning apparatus to accept sensory input from external entities. These may include, without limitation, video, audio, capacitive, radio, vibrational, ultrasonic, infrared, and temperature sensors radar, lidar and/or sonar, and/or other sensory devices.

Electrical components used in the illustrated implementation (not shown) may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/ intelligence, and other fields (as discussed below).

The communications interface 826 may include one or more connections to external computerized devices to allow for, inter alia, management of the robotic device, e.g., as described above with respect to FIG. 1 and/or with respect to FIG. 7. The connections may include any of the wireless or wireline interfaces discussed above, and further may include customized or proprietary connections for specific applications. In some implementations, the communications interface 826 may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the learning controller apparatus (e.g., 710 in FIG. 7) and a remote computing entity (e.g., 706, 704 in FIG. 7).

The power system 824 may be tailored to the needs of the application of the device. For example, for a small-sized lower power appliance, a wireless power solution (e.g. battery, solar cell, inductive (contactless) power source, rectification, and/or other) may be appropriate. For building management applications, battery backup/direct wall power may be superior. In addition, in some implementations, the power system may be adaptable with respect to the training of the appliance apparatus (e.g., such as described in co-owned and co-pending U.S. patent application Ser. No. 14/489,242, entitled "APPARATUS AND METHODS FOR REMOTELY CONTROLLING ROBOTIC DEVICES", filed Sep. 17, 2014 and incorporated herein by reference in its entirety). The training may improve operational efficiency of the appliance (to include power consumption efficiency) through learned management techniques specifically tailored to the tasks performed by the appliance apparatus.

Figure 9:
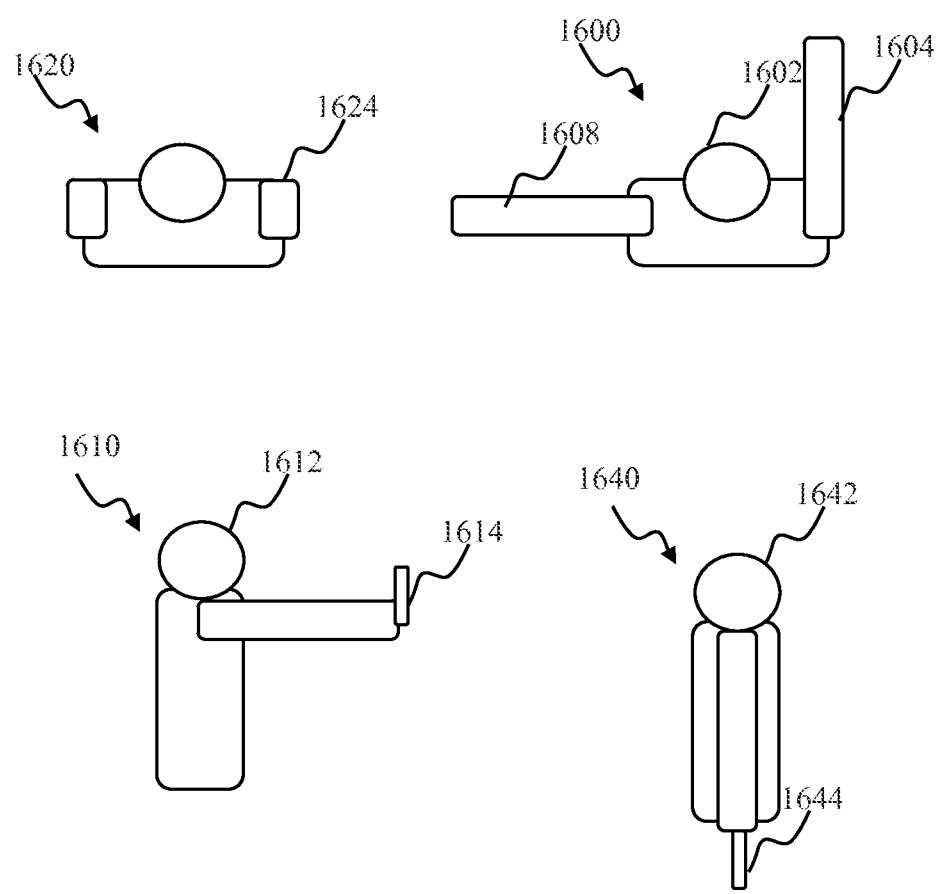
FIG. 9 illustrates gestures of a human operator used for communicating control indications to a robotic device, gestures being detectable by a salient feature detection system of, e.g., FIGS. 6-7, in accordance with one or more implementations.

FIG. 9 illustrates four different gestures of a human operator used for communicating control indications to a robotic device comprising distance determination apparatus described herein, in accordance with one or more implementations.

At the top left of FIG. 9 is a top view of a user and may illustrate a base posture 1620 of the user, with arm 1624 at a base state. The diagram at the top right depicts user gestures 1600 communicating a right turn action to a robotic device (e.g., the vehicle 160 in FIG. 1). The robotic device 160 may utilize stereo images provided by the cameras 166 in order to detect position of the user arms 1604, 1608. In some implementations, the arm 1604, 1608 position may be determined using the distance determination methodology configured based on encoding interleaved left/right portions of the stereo imagery. By way of an illustration, the gesture 1600 may be determined based on a comparison of distance between the robot and the user arms in positions 1604, 1608 relative the user arms in position 1624 (top left). In one or more implementations, the gesture 1600 may be determined based on a comparison of distance between the robot and the user arms in positions 1604, 1608 relative the user head 1602.

At the bottom left of FIG. 9 is a side view of the user and may depict user gesture 1610 communicating a stop action to a robotic device (e.g., the vehicle 160 in FIG. 1). The robotic device 100 may utilize stereo images provided by the camera(s) 166 in order to detect position of the user arms, head 1612, 1642, and/or hands 1614, 1644. In some implementations, the hand 1614, 1644 position may be determined using the distance determination methodology configured based on encoding interleaved left/right portions of the stereo imagery. By way of an illustration, the gesture 1610 may be obtained based on a comparison of distance between the robot and the user hands in position 1614 relative the user hand in position 1644 in gesture 1640 at the bottom right of FIG. 9D. In one or more implementations, the gesture 1610 may be determined based on a comparison of distance between the robot and the user hand in position 1614 relative the user head 1612 in FIG. 9C. In some implementations (not shown) the user may communicate an indication to the robotic device by, e.g., appearing in view of the camera. By way of an illustrative example, the user stepping in front of the vehicle may indicate to the vehicle a stop action.

Figure 10:
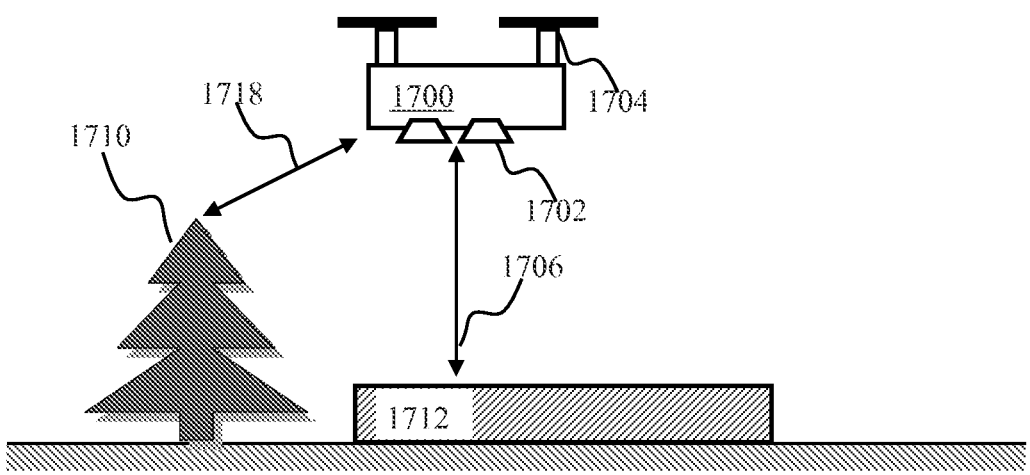
FIG. 10 is a graphical illustration depicting an exemplary unmanned robotic apparatus comprising salient feature determination apparatus of the disclosure configured for autonomous navigation, in accordance with one or more implementations.

FIG. 10 illustrates use of distance determination methodology by an unmanned robotic apparatus configured for autonomous navigation, in accordance with one or more implementations. The unmanned autonomous vehicle (AUV) 1700 may comprise a plurality of cameras 1702 disposed spatially from one another. Video stream provided by the cameras 1702 may be interleaved and encoded using any applicable methodology described herein (e.g., with respect to FIGS. 3, 6, and/or 9). The encoding may enable a controller of the vehicle 1700 to determine distance 1706 between the vehicle 1700 and the landing location 1712, and/or distance 1718 to obstacles (e.g., a tree 1710). The controller may utilize the distance and/or vehicle motion information to control actuators 1704 when landing, during take-off and/or navigating around obstacles.

In some implementations, the saliency of an item (such as an object, a person, a pixel, and/or other) may be described by a characteristic by which the item may stand out relative to its neighbors. For example, a salient vehicle may comprise a vehicle that may be moving differently (e.g., going slower/faster than the rest of the traffic, weaving from lane to lane) compared to the rest of the traffic. A salient object for target approach may comprise a stationary and/or moving ball on a moving background due to self-motion by the vehicle.

Figure 11:
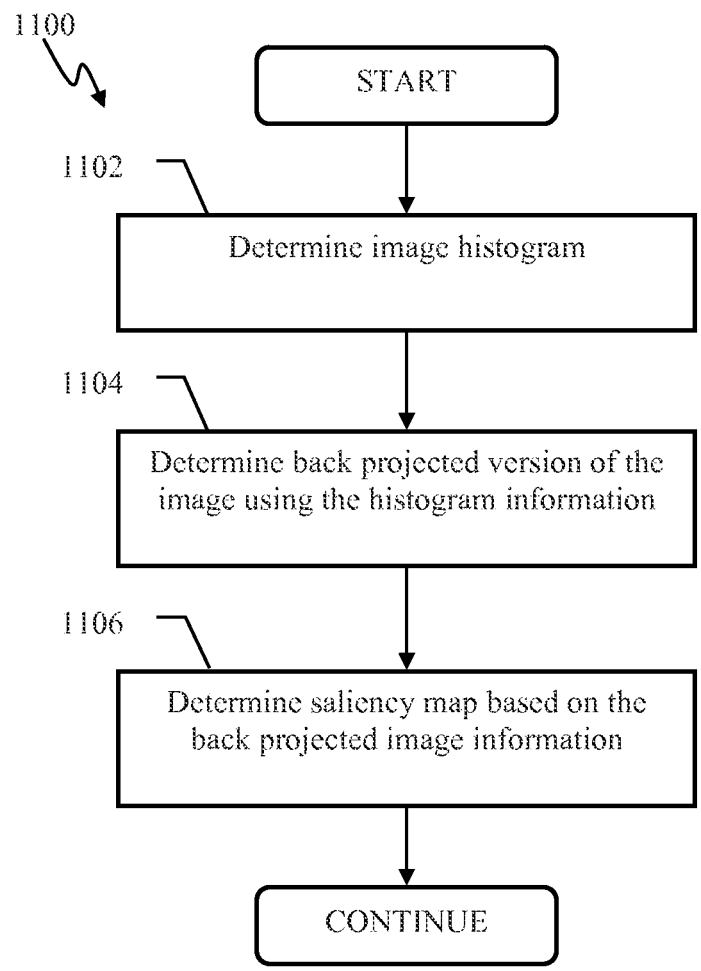
FIG. 11 is a logical flow diagram illustrating a method of determining a salient feature using encoded video motion information, in accordance with one or more implementations.

Referring now to FIG. 11, a logical flow diagram of one embodiment of a method 1100 of determining a salient feature using encoded video motion information in accordance with one or more implementations is shown. In step 1102, a histogram of an input image is determined. For example, in one such implementation, the value (e.g., 0 or 128) of each pixel of the image is determined. The number of occurrences of each pixel value are counted and analyzed, e.g., the numbers of each pixel value are compared to determine which values are more or less likely or frequent, the less likely pixels being more unique and thus more salient.

In step 1104, a new image or a back projection is created based on the histogram information of the input image. Each pixel of the back projected version of the input image is associated with the pixel count of the pixel at that location. For example, if the input image has 320,000 pixels with pixel value 0, and a first pixel of the input image has the value 0, the first pixel of the back projected image has a pixel count of 320,000 at the location of the first pixel. In step 1106, a saliency map or mask may be created based on the back projected image information. The back projected image and/or the saliency map may be useful for creating an image that clearly delineates salient objects from the background, such as that shown in FIG. 2A.

Figure 12:
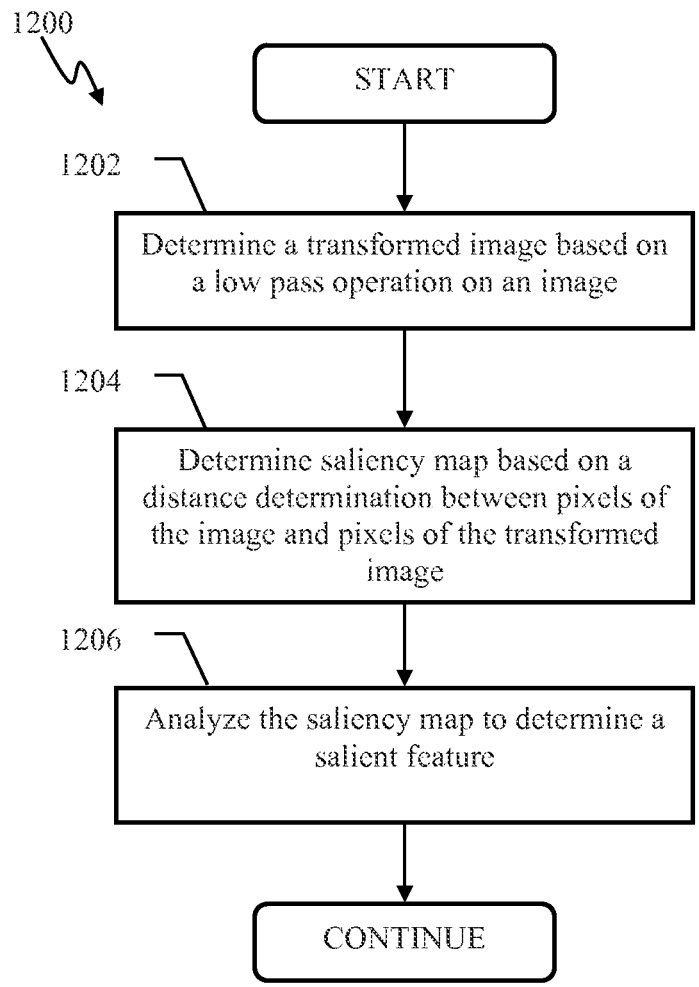
FIG. 12 is a logical flow diagram illustrating a method of data processing useful for determining features, in accordance with one or more implementations.

In FIG. 12, a logical flow diagram of one embodiment of a method 1200 of data processing useful for determining features in accordance with one or more implementations is shown. In contrast to an approach wherein saliency determined based solely on a histogram is/becomes impractical, e.g., most of the pixels are salient (unique) and give a weak signal, other approaches such as a low-pass image filtering may be utilized. In step 1202, an input image is transformed based on a low-pass operation on the image. In one embodiment, a Gaussian kernel is applied to the input image to create the transformed image. In step 1204, a saliency map may be determined based on the difference between a pixel and the average value of pixels in a surrounding region. The saliency map comprises pixels that each have a parameter associated with distance between the original image and the low-passed image.

In step 1206, the saliency map determined in step 1204 is analyzed to determine a salient feature. In certain embodiments, the further the pixel from the average value of the surrounding region (i.e., the distance is larger), the more salient the pixel is. Such distance may be determined in various ways, such as a function based on Euclidean distance or Manhattan distance. Furthermore, certain features of the image may be enhanced or deemphasized, e.g., only process chrominance, disregard luminance. Orientation parameters may be included in the pixel value, such as angle, phase, frequency, contrast, etc. that may be used to detect differences in orientation in salient features of the image.

Figure 13:
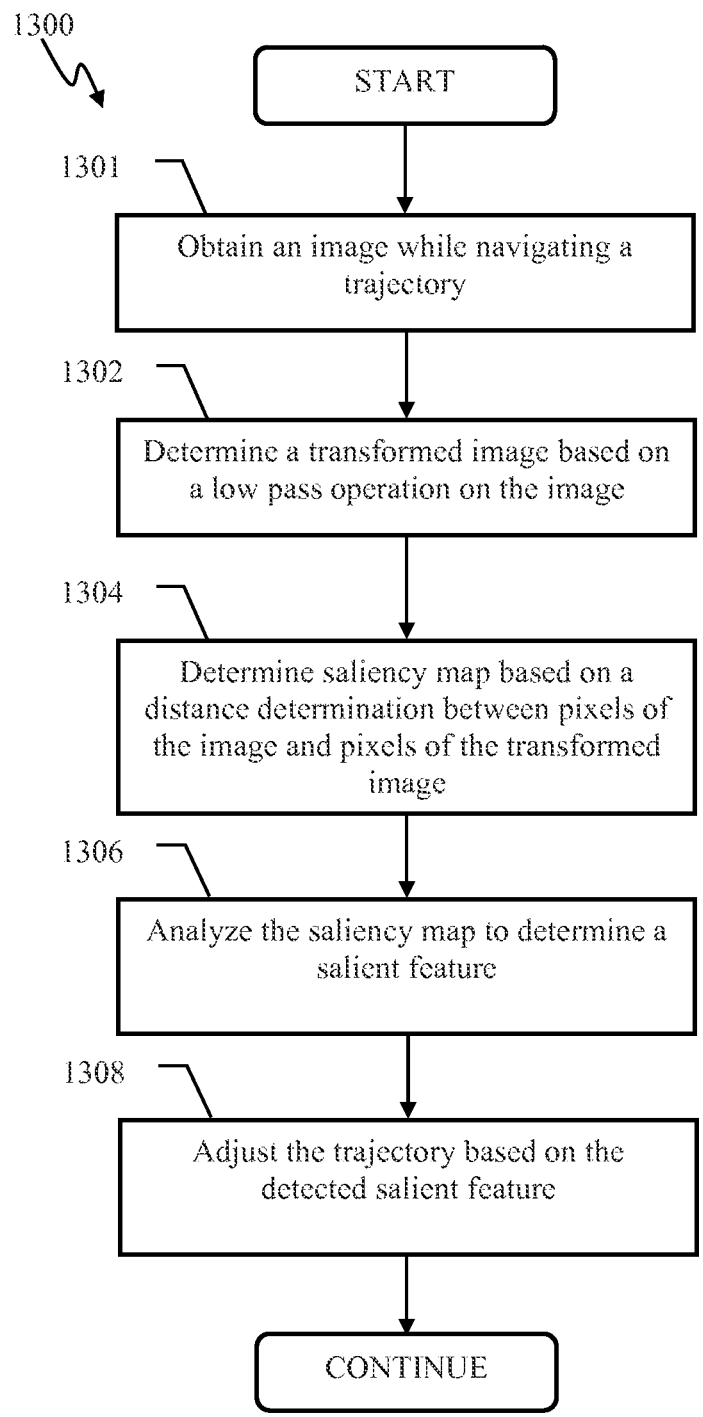
FIG. 13 is a logical flow diagram illustrating a method of trajectory navigation by a robotic device using salient feature detection, in accordance with one or more implementations.

In FIG. 13, a logical flow diagram of one embodiment of a method 1300 of trajectory navigation by a robotic device using salient feature detection in accordance with one or more implementations is shown. Autonomous navigation by a robotic apparatus may give rise to a need for detection of certain objects, e.g., obstacles and obstructions, or desired paths. In step 1301, an image is obtained while navigating a trajectory. In step 1302, a low-pass operation is applied to the captured image to obtain a transformed image. In steps 1304 and 1306, a saliency map is determined based on a distance determination between pixels of the image and the pixels of the transformed image, and then the saliency map is analyzed to determine a salient feature of the image. Various implementations are possible by applying operations and parameters such as those described above. The salient feature may indicate e.g., an obstacle or an incorrect path, or it may indicate the desired path to follow. Based on the salient feature determined in step 1306, the robotic apparatus may adjust its trajectory in step 1308.

Implementations of the principles of the disclosure may be further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure. Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for tracking an object in a visual field, comprising:
a memory including computer readable instructions stored thereon; and
at least one processor configured to execute the computer readable instructions to,
generate a first image corresponding to a saliency image, the saliency image being based on a back projection image, the back projection image being the same size as an input image,
generate a heat map based on a distance function of the back projection image and the input image,
determine a mask corresponding to a region of the visual field based on a peak in the heat map, the heat map representing likelihood of presence of the object in the visual field based on a confidence value of the heat map, and
combine the saliency image and the mask in order to track the object in the visual field.

2. The system of claim 1, wherein the back projection image is based on histogram of pixel values of the input image such that every pixel in the back project image includes the same value as pixel in the input image.

3. The system of claim 1, wherein the generating of the saliency image based on difference between a pixel and an average value of pixels in a surrounding region of object in the visual field.

4. The system of claim 1, wherein the at least one processor is further configured to,
generate the heat map based on a distance function of the back projection image and the input image.

5. The system of claim 1, wherein the confidence value of the heat map include a first confidence value and a different second confidence value, the first confidence value of zero represents no change in a result, and the second confidence value of one represents significant change in the result.

6. The system of claim 1, wherein the heat map is representative of a weighted sum of a plurality of individual heat maps.

7. The system of claim 6, wherein the plurality of individual heat maps includes at least a first heat map and a second heat map, the first heat map corresponds to exclude certain positions as containing the object in the visual field, and the second heat map corresponds to distance detection threshold of the object.

8. A method for tracking an object in a visual field, comprising:
generating a first image corresponding to saliency image, the saliency image being based on a back projection image being the same size as an input image;

generating a heat map based on a distance function of the back projection image and the input image;

determining a mask corresponding to a region of the visual field based on a peak in the heat map, the heat map representing likelihood of presence of the object in the visual field based on a confidence value of the heat map; and combining the saliency image and the mask in order to track the object in the visual field.

9. A non-transitory computer readable medium having computer readable instructions stored thereon, that when executed by at least one processor configure the at least one processor to, generate a first image corresponding to saliency image, the saliency image being based on a back projection image being the same size as an input image;

generate a heat map based on a distance function of the back projection image and the input image;

determine a mask corresponding to a region of the visual field based on a peak in the heat map, the heat map representing likelihood of presence of the object in the visual field based on a confidence value of the heat map; and combine the saliency image and the mask in order to track the object in the visual field.

* * * * *